(12) United States Patent
Peng

(10) Patent No.: US 11,301,221 B2
(45) Date of Patent: Apr. 12, 2022

(54) RAPID CODE COMPILING SYSTEM

(71) Applicant: SAP SE, Walldorf (DE)

(72) Inventor: Yang Peng, Pleasanton, CA (US)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 16/714,101

(22) Filed: Dec. 13, 2019

(65) Prior Publication Data

US 2021/0182035 A1 Jun. 17, 2021

(51) Int. Cl.
*G06F 9/44* (2018.01)
*G06F 8/41* (2018.01)
*G06F 8/36* (2018.01)
*G06F 8/71* (2018.01)
*G06F 9/445* (2018.01)
*G06F 9/455* (2018.01)

(52) U.S. Cl.
CPC .................. *G06F 8/41* (2013.01); *G06F 8/36* (2013.01); *G06F 8/71* (2013.01); *G06F 9/445* (2013.01); *G06F 9/45516* (2013.01)

(58) Field of Classification Search
None
See application file for complete search history.

(56) References Cited

U.S. PATENT DOCUMENTS

| | | | | | |
|---|---|---|---|---|---|
| 5,204,960 | A * | 4/1993 | Smith | ........................ | G06F 8/48 717/111 |
| 5,230,050 | A * | 7/1993 | Iitsuka | ...................... | G06F 8/48 717/145 |
| 5,978,585 | A * | 11/1999 | Crelier | ...................... | G06F 8/48 717/118 |
| 6,308,320 | B1 * | 10/2001 | Burch | ....................... | G06F 8/48 717/145 |
| 8,312,430 | B2 * | 11/2012 | Best | ........................... | G06F 8/71 717/122 |
| 9,916,224 | B2 * | 3/2018 | Macleod | ............. | G06F 11/3668 |
| 2002/0040470 | A1 * | 4/2002 | Guthrie | ............... | G06F 12/0269 717/126 |
| 2004/0221260 | A1 * | 11/2004 | Martin | .................. | G06F 40/143 717/104 |

(Continued)

OTHER PUBLICATIONS

Michael Woerister, "Incremental Compilation", Sep. 8, 2016, https://blog.rust-lang.org/2016/09/08/incremental.html (Year: 2016).*

(Continued)

*Primary Examiner* — Wei Y Zhen
*Assistant Examiner* — Lanny N Ung
(74) *Attorney, Agent, or Firm* — Klarquist Sparkman, LLP

(57) ABSTRACT

Compilation is initiated of previously-compiled code in which only a subset of the previously-compiled code was modified since a previous compilation. Thereafter, modified code corresponding to the subset of the previously-compiled code that was modified since the previous compilation is identified. Further, dependent code within the previously-compiled code that is dependent on the modified code is also identified. Using this information, only the identified modified code and the dependent code can be compiled. In some variations, at least a portion of the other parts of the previously-compiled code can be reused. Related apparatus, systems, techniques and articles are also described.

18 Claims, 5 Drawing Sheets

(56) References Cited

U.S. PATENT DOCUMENTS

| | | | | |
|---|---|---|---|---|
| 2007/0028227 | A1* | 2/2007 | Lebowitz | G06F 8/20 |
| | | | | 717/168 |
| 2007/0277159 | A1* | 11/2007 | Wagner | G06F 9/445 |
| | | | | 717/136 |
| 2010/0306734 | A1* | 12/2010 | Gupta | G06F 8/51 |
| | | | | 717/107 |
| 2012/0131473 | A1* | 5/2012 | Biron, III | G06F 9/45512 |
| | | | | 715/744 |
| 2015/0378697 | A1* | 12/2015 | Sathyanathan | G06F 8/41 |
| | | | | 717/146 |
| 2016/0117154 | A1* | 4/2016 | Przygienda | G06F 8/433 |
| | | | | 717/152 |
| 2018/0267884 | A1* | 9/2018 | Dhanda | G06F 11/3684 |

OTHER PUBLICATIONS

Dongjoon Park et al., "Case for Fast FPGA Compilation using Partial Reconfiguration", 2018 (Year: 2018).*

Lassi A. Tuura et al., "Ignominy: a tool for software dependency and metric analysis with examples from large HEP packages", 2001 (Year: 2001).*

* cited by examiner

RAPID CODE COMPILING SYSTEM

TECHNICAL FIELD

The subject matter described herein relates to a rapid code compiling system for modern programming languages.

BACKGROUND

Code compilation is the process of translating computer code written in a first programming language into another language. In particular, compilers are use to translate source code from a high-level programming language to a lower level language to create an executable program. The complexity, time, and computing resources required to process code is largely based on the size of the corresponding code base. In many cases, only small changes are made to a code base; however, with most conventional systems, the entire code base needs to be re-compiled every time an update needs to be pushed.

SUMMARY

In a first aspect, compilation is initiated of previously-compiled code in which only a subset of the previously-compiled code was modified since a previous compilation. Thereafter, modified code corresponding to the subset of the previously-compiled code that was modified since the previous compilation is identified. Further, dependent code within the previously-compiled code that is dependent on the modified code is also identified. Using this information, only the identified modified code and the dependent code can be compiled. In some variations, at least a portion of the other parts of the previously-compiled code can be reused.

A programming language of the code can be a script-like programming language in which compiling forms part of a software development kit (SDK). Example programming languages include, for example, JAVA, .NET, GO™, or PYTHON®.

In some variations, a relative percentage of the identified modified code and the dependent code relative to previously-compiled code as a whole can be determined. If the changes in the code as indicated by the relative percentage are above a pre-defined threshold, the entire code base can be compiled (as opposed to only selectively compiling some of the code base).

As part of the identification of dependent code, cycle dependencies within the modified code can be identified. In the case of code deletion, a binary code scan can be conducted to identify locations of code that reference deleted code to determine whether it is safe to delete the identified locations.

All extracted classes corresponding to the modified code can, for example, be placed in a folder with a root classpath. The compiling can be performed by a compiling server which, in some variations, can have a REST application programming interface (API). The compiling server can accept a file group as a compile unite and compile such file group against the root class path. Further, dependencies within the root classpath can be resolved.

An assembly manager can be used to assemble all code in the root classpath into one or more final assemblies.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter enables much more rapid code compilation by bypassing/ignoring unchanged code and only compiling those part of a changed file on demand (per commit). Moreover, by decreasing code compilation times, continuous integration (CI) software systems can be more quickly informed about updates to the code base.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to more rapid compilation of code and is applicable to many different programming languages and, in particular, to programming languages such as JAVA, .NET, GO™, PYTHON® and other script-like languages in which compiling is also part of the software development kit (SDK). The current techniques are specifically directed to addressing scenarios in which compilation is required when only small changes (e.g., 1%, etc.) have been made to the code base.

Figure 1:
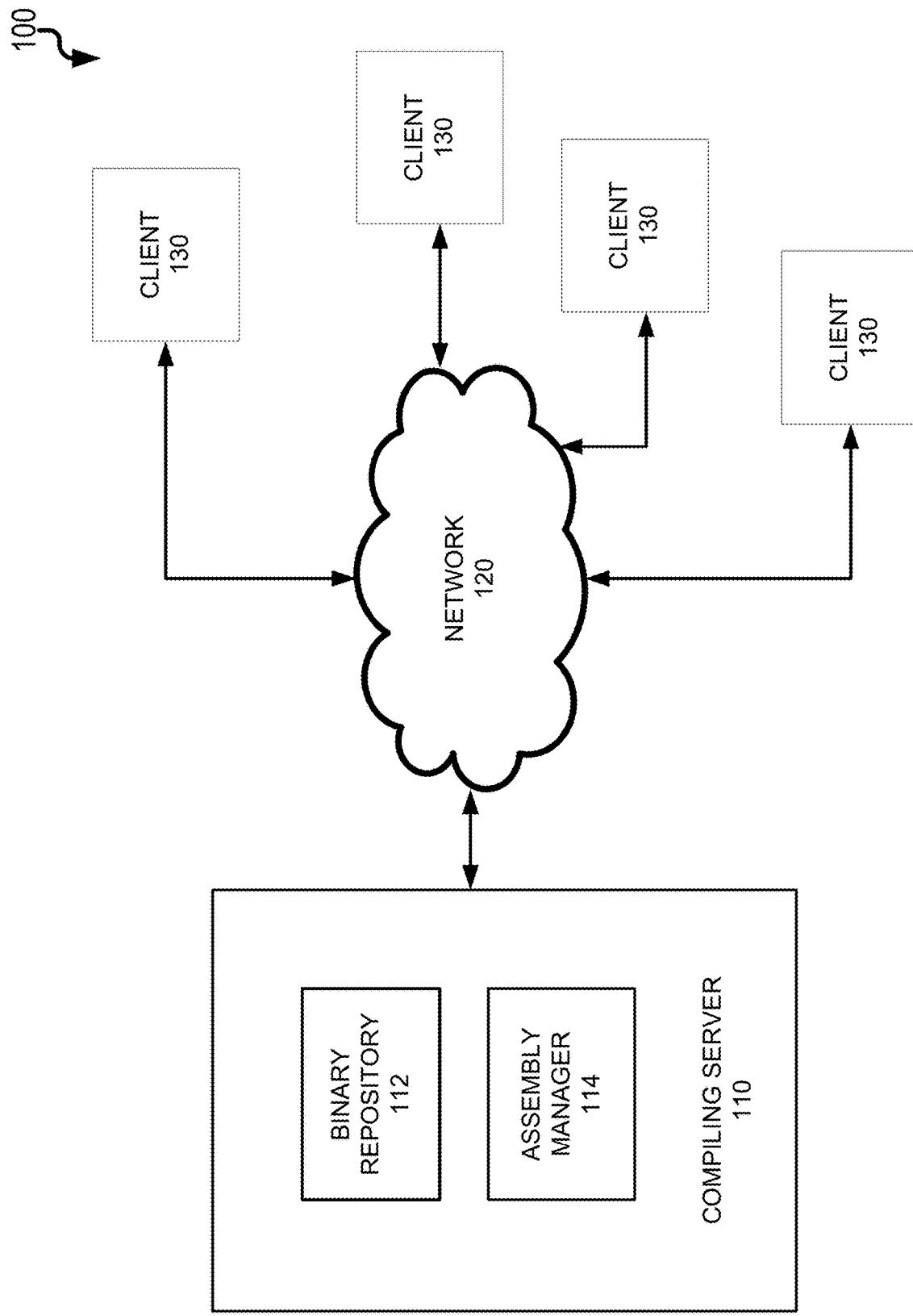
FIG. 1 is a diagram illustrating an architecture for a rapid code compilation system.

With reference to diagram 100 of FIG. 1, a compiling server 110 can interact with a plurality of clients (i.e., computing devices, etc.) 130 over a network 120. These clients 130 can represent, for example, computers used by code developers working in concert to develop/edit/revise a larger code base. The compiling server 110 can include one or more software repositories (sometimes referred to as "repos") which are storage locations from which software packages/artefacts can be retrieved. For example, the compiling server 110 can include, execute, and/or interface with a binary repository 112 designed to optimize the download and storage of binary files used and produced in software development. In addition, the compiling server 110 can include, execute, and/or interface with an assembly manager 114 designed to create object code by translating combinations of mnemonics and syntax for operations and addressing modes into their numerical equivalents. The assembly manager 114 acts to organize a final assembly output based on generated binary files. The assembly manager 114 also calculates constant expressions and resolves symbolic names for memory locations and other entities.

Figure 2:
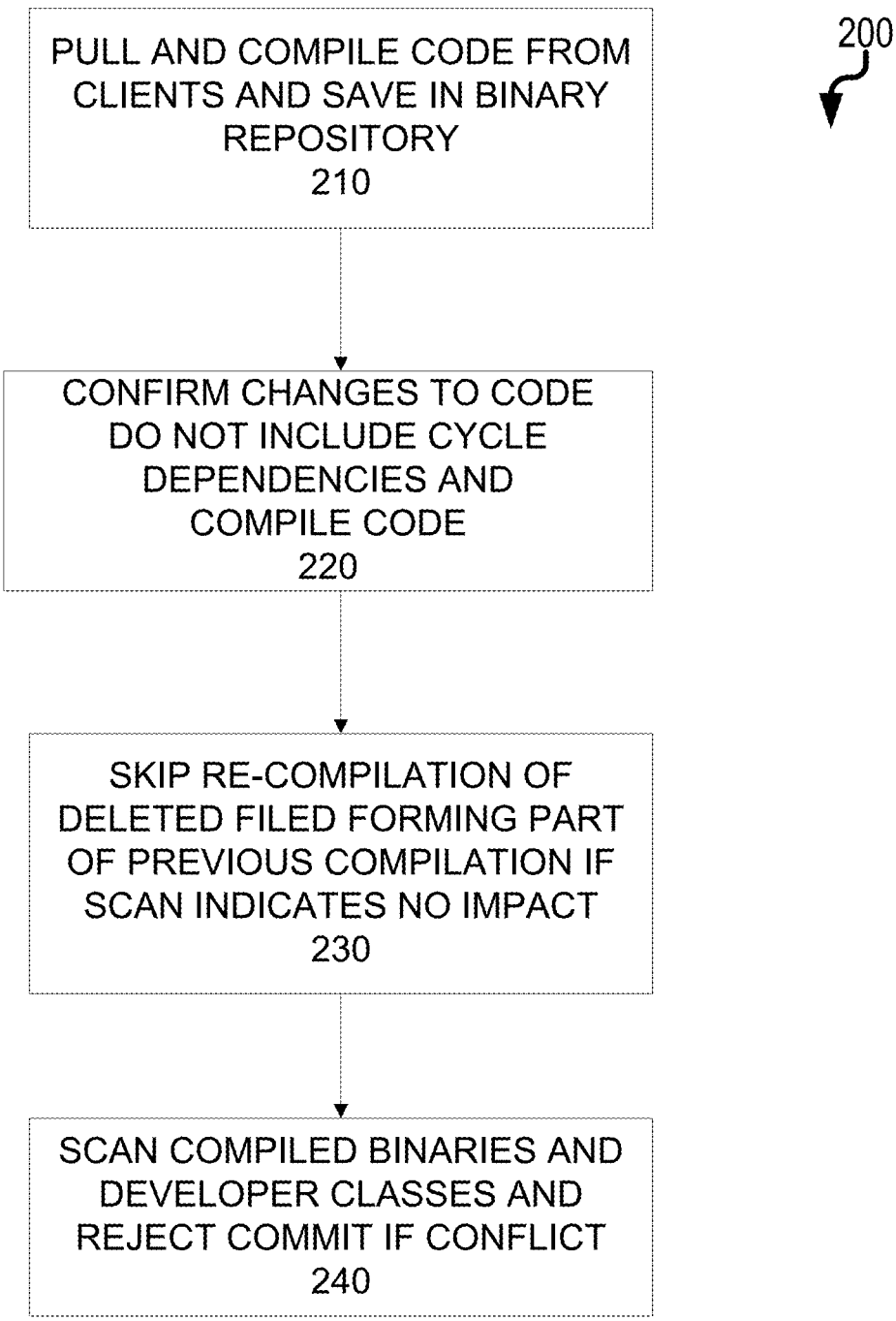
FIG. 2 is a first process flow diagram illustrating rapid compilation of files.

FIG. 2 is a process flow diagram 200 illustrating a process for rapid compilation of code. Initially, at 210, the compiling server 110 pulls the latest code base from the clients 130, conducts a full compilation of the code base, and then saves the results of such compilation (e.g., a set of executable files, etc.) into the binary repository 112.

Thereafter, at 220, a developer makes changes to a file and such changes are sent from the corresponding client 130 to the compiling server 110. The compiling server 110 then confirms that the compiled results (from 210) do not have any cycle dependencies (sometimes referred to as circle dependencies). Cycle dependencies, in this regard, refers to situations when two or more modules reference each other which, when present, can cause the code to malfunction or otherwise execute in an unintended fashion. When it is confirmed, the changed class can be compiled by the compiling server 110. In addition, it can be confirmed by the compiling server 110 that there has been no interface/protocol change so that the commit of the files (i.e., compilation of the files) will not cause a negative impact on the binary repository 112.

Subsequently, at 230, a developer deletes a file that formed part of the previously compiled results. The compiling server 110 then scans the file containing the binary files and then does a full scan on the binary repository 112 (which might take as little time as a few seconds). Care needs to be taken when deleting logic/code from an existing code base as such code may be still used by other module/code. The fast compiling may not be able to detect such interrelationships (e.g., with some cases only a full code base compile can detect the interdependencies even if the system is a modularized compile system). The binary code scan as provided herein allows for the identification of all possible locations of code that reference the deleted code logic (it can be a method and/or a whole class unit) to determine whether it is safe to delete those classes. This full scan can be used to characterize the impact of the deletion. If there is an impact, the deletion cannot commit (i.e., be committed by the compiling server 110) and the compiling server 110 will delete the corresponding class in the binary repository 112. For JAVA, byte code reader can be used to go through all the binary code, and to build the reference tree for all classes. With this reference tree, it is possible then to find class/method's references including deleted classes/methods.

At 240, in another scenario, the developer delete, adds, and/or changes some files. With this scenario, the compilation server 110 first compiles the files and keeps the changed class binaries. For deleted files, classes, or methods, a scan can be performed on the binary repository 112 as well as newly compiled classes. If there is conflict (e.g., Class A is in both the binary repository 112 and the code changes, then the changed class is scanned), it is confirmed that the deletion of the file has no impact, and if so, the commit will be rejected.

Figure 3:
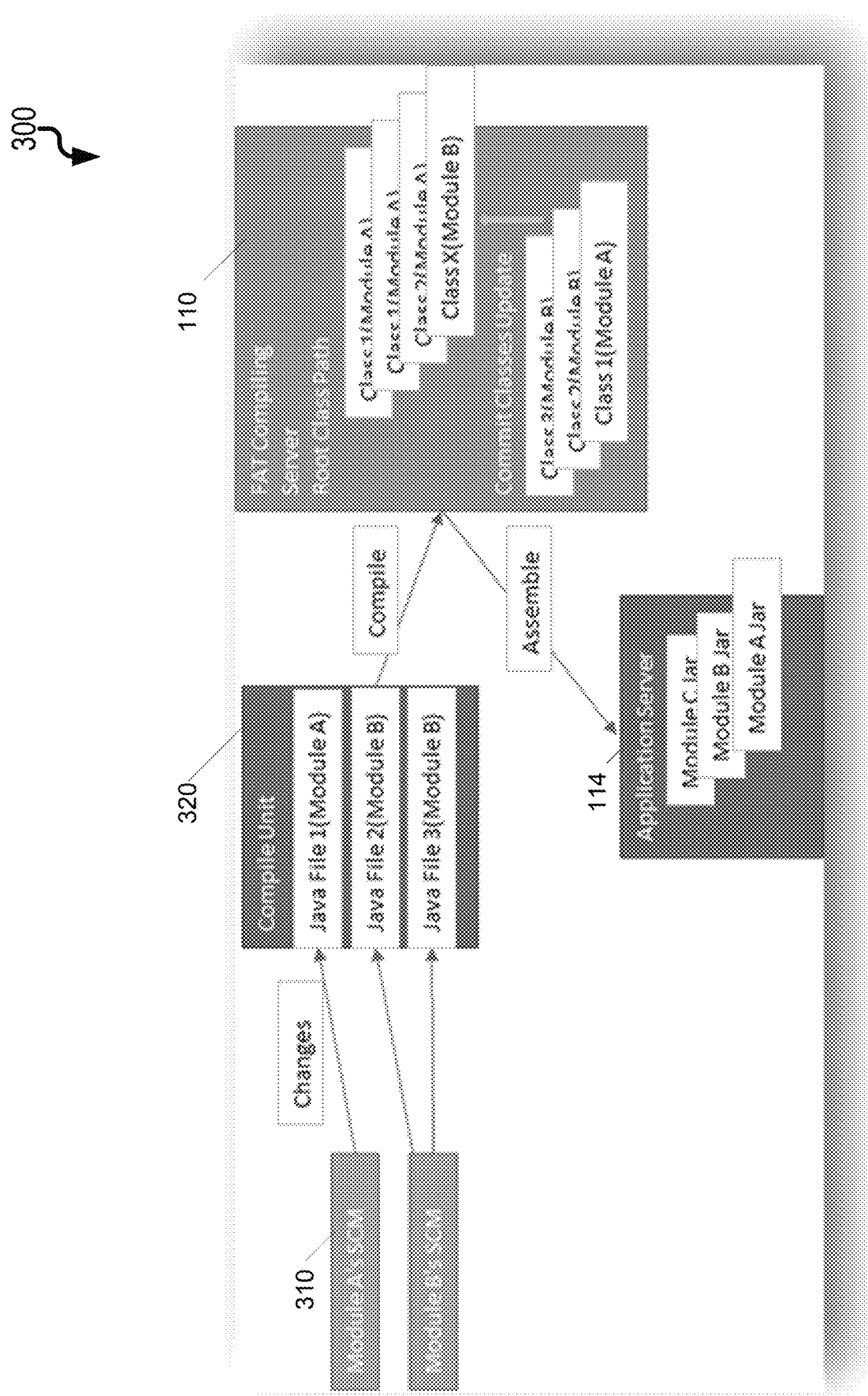
FIG. 3 is a diagram illustrating compilation of JAVA files according to their corresponding classes.

With reference to diagram 300 of FIG. 3, the compiling server 110 (which in this example can be a FAT compiling server) can extract all product related binaries together and update them as needed. For the example below, the code is in JAVA. The FAT compiling server 110 can extract all classes from the final assembly (e.g., JAR ball, etc.) and place such extracted classes in a folder with a root classpath. The compiling server 110 can have, for example, a REST API. The compiling server 110 can accept a file group as a compile unit 320 and then compile the file group against the root classpath. As it is only incremental, the compile unit will only contain changed files (which is really small). Therefore, if there is a desired to compile those files, the dependencies need to be resolved. Therefore, to make it simple, all dependencies (the root classpath) is resolved. While the root classpath includes more dependencies than required, processing this will not meaningfully impact the corresponding performance and result.

Each file can contain a MODULE property which is used by the compiling server 110, to identify which module the module belongs to. In addition, the assembly manager 114 can later use this information to compose JAR balls. The modules can be later reused by the assembly manager 114 to reassemble those JAR balls from FAT root classes with all class files. A source code management (SCM) system 310 is checked and only changed source code files are sent to the compiling server 110 for fast compiling. The SCM system 310 can be configure to allow a developer to check in (commit) code for different purpose in different branches.

The compiling server 110 can find all classes belonging to the given module and produce the JAR ball and provide it to the assembly manager 114 for further production deployment, or testing. In other words, the assembly manager 114 can assemble everything in the root class path (i.e., all compiled binary classes) into final assemblies as may be required. As an example, there can be 10K class files belonging to 10 application servers. In order to deploy an image processing server, the assembly manager 114 can pick up 20 modules (i.e., modules name list) of the image processing server. Meanwhile, those 20 modules may refer to other classes which belong to different modules, and as such, the assembly manager 114 can assemble those modules as well.

In certain cases, compilation by the compiling server 110 can result in a failure. Such failures can be due to, for example, poor quality source code commits. As the compiling server 110 can include a REST API-based service, compilation can be requested prior to code commit. This can be accomplished by having a developer at one of the clients 130 completing its changes to the code. Such changes can be stored in a local repository (e.g., SCM 310) and then scanned. With this arrangement, the developer can utilize their own development environment to compile the code. However, before the code can be committed it the binary files can be subjected to a remote for a scan to ensure that any changes will not impact other modules which cannot be accessed or otherwise compiled. So this will provide a mechanism to allow the developer to make verify the quality of the code before committing or before interaction with a source code management system (SCM), so with any newly added code, deleted code, or changed code, the developer will get immediate feedback regarding code quality.

The compiling server 110 can later be called with the commit indication being set to false to ensure that the compiling server 110 can properly compile the code. Thereafter, the developer commits the codes. These changes will be picked up by the continuous delivery process and then auto-committed to the final root classpath in the binary repository 112.

Figure 4:
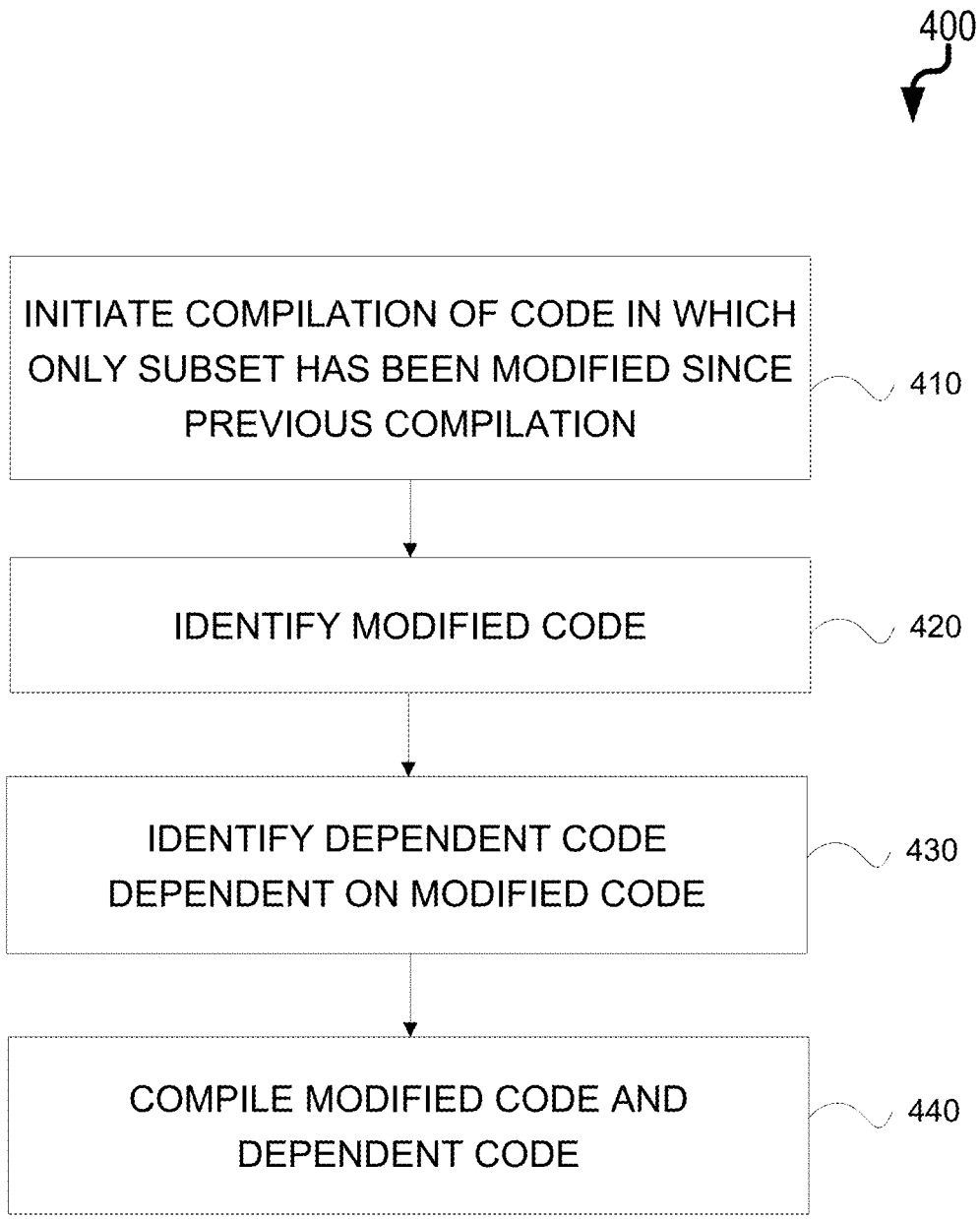
FIG. 4 is a second process flow diagram illustrating rapid compilation of files.

FIG. 4 is a diagram 400 in which, at 410, compilation is initiated of previously-compiled code in which only a subset of the previously-compiled code was modified since a previous compilation. Thereafter, at 420, modified code corresponding to the subset of the previously-compiled code that was modified since the previous compilation is identified. Further, at 430, dependent code within the previously-compiled code that is dependent on the modified code is also identified. Using this information, at 440, only the identified modified code and the dependent code can be compiled. In some variations, at least a portion of the other parts of the previously-compiled code can be reused.

Figure 5:
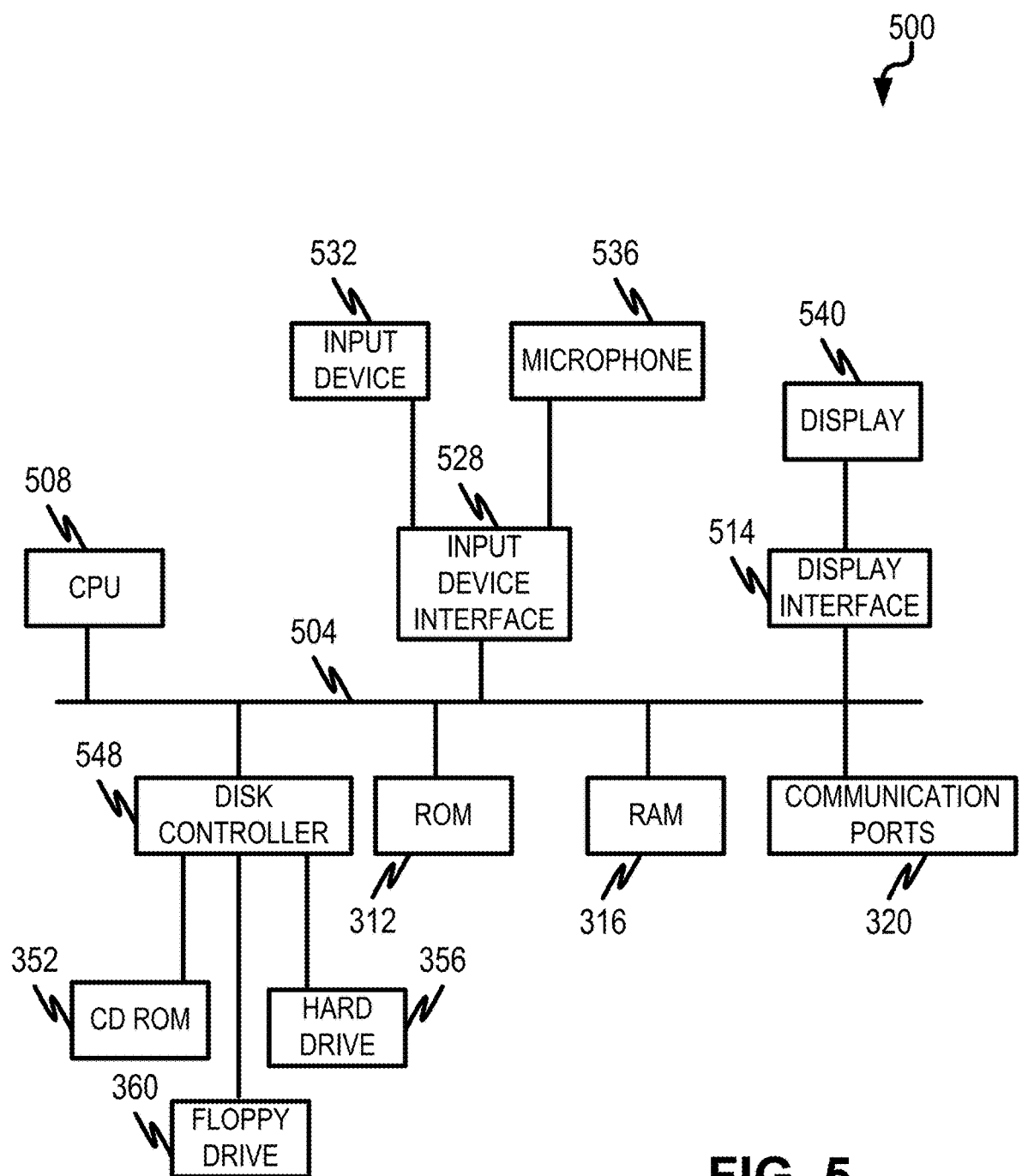
FIG. 5 is a diagram illustrating aspects of a computing device for implementing the current subject matter.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   initiating compilation of previously-compiled code in which only a subset of the previously-compiled code was modified since a previous compilation, wherein the compilation and the previous compilation transform source code in a high-level programming language into respective first and second executable computer programs;
   checking the second executable computer program of the previous compilation for absence of cycle dependencies;
   identifying modified code corresponding to the subset of the previously-compiled code that was modified since the previous compilation;
   identifying dependent code within the previously-compiled code that is dependent on the modified code;
   determining a relative percentage of the identified modified code and the dependent code relative to the previously-compiled code as a whole;
   in a first case, responsive to the relative percentage being below a pre-defined threshold, compiling only the identified modified code and the dependent code into the first executable computer program and reusing at least a portion of the previously-compiled code; and
   in a second case, responsive to the relative percentage being above the pre-defined threshold, compiling all of the previously-compiled code into the first executable computer program.

2. The method of claim 1, wherein a programming language of the code is a script-like programming language in which compiling forms part of a software development kit (SDK).

3. The method of claim 1, wherein the programming language is selected from a group consisting of: JAVA language, .NET language, GO™ language, or PYTHON® language.

4. The method of claim 1, wherein the identification of dependent code comprise: conducting a binary code scan to identify locations of code that reference deleted code to determine whether it is safe to delete the identified locations.

5. The method of claim 1 further comprising:
   placing all extracted classes corresponding to the modified code in a folder with a root classpath.

6. The method of claim 5, wherein the compiling is performed by a compiling server having a Representational State Transfer (REST) application programming interface (API).

7. The method of claim 6 further comprising:
   accepting, by the compiling server, a file group as a compile unit;
   compiling the file group against the root classpath; and
   resolving dependencies in the root classpath.

8. The method of claim 7 further comprising:
   assembling, by an assembly manager, all code in the root classpath into one or more final assemblies.

9. The method of claim 1, wherein the identifying modified code is performed at a source code management system, the compiling is performed at a compiling server and, in the first case, source files containing the modified code are transmitted from the source code management system to the compiling server for compilation.

10. A system comprising:
    at least one data processor; and
    memory storing instructions which, when executed by the at least one data processor, result in operations comprising:
       initiating compilation of previously-compiled code in which only a subset of the previously-compiled code was modified since a previous compilation, wherein the compilation and the previous compilation transform source code in a high-level programming language into respective first and second executable computer programs;
       checking the second executable computer program of the previous compilation for absence of cycle dependencies;
       identifying modified code corresponding to the subset of the previously-compiled code that was modified since the previous compilation;
       identifying dependent code within the previously-compiled code that is dependent on the modified code, wherein the identifying dependent code further comprises:
          conducting, subsequent to deletion of code, a binary code scan to identify locations of code that reference the deleted code, to determine whether it is safe to delete the identified locations; and
       compiling only the identified modified code and the dependent code into the first executable computer program.

11. The system of claim 10, wherein the programming language is selected from a group consisting of: JAVA language, .NET language, GO™ language, or PYTHON® language.

12. The system of claim 10, wherein the operations further comprise:
    determining a relative percentage of the identified modified code and the dependent code relative to previously-compiled code as a whole; and
    wherein all code is compiled when the relative percentage is above a pre-defined threshold.

13. The system of claim 10, wherein the operations further comprise:
    placing all extracted classes corresponding to the modified code in a folder with a root classpath.

14. The system of claim 13 further comprising a compiling service having a Representational State Transfer (REST) application programming interface (API).

15. A non-transitory computer program product storing instructions which, when executed by at least one computing device, result in operations comprising:
    initiating compilation of previously-compiled code in which only a subset of the previously-compiled code was modified since a previous compilation, wherein the compilation and the previous compilation transform source code in a high-level programming language into respective first and second executable computer programs;

identifying modified code corresponding to the subset of the previously-compiled code that was modified since the previous compilation;

identifying dependent code within the previously-compiled code that is dependent on the modified code;

determining a relative percentage of the identified modified code and the dependent code relative to the previously-compiled code as a whole;

in a first case, responsive to the relative percentage being below a pre-defined threshold, compiling only the identified modified code and the dependent code into the first executable computer program; and in a second case, responsive to the relative percentage being above the pre-defined threshold, compiling all of the previously-compiled code into the first executable computer program.

16. The non-transitory computer program product of claim 15, wherein the identifying dependent code further comprises:

conducting a binary code scan to identify locations of code that reference deleted code to determine whether it is safe to delete the identified locations.

17. The non-transitory computer program product of claim 15, wherein the initiating is performed at a developer's client computing device, and the operations further comprise committing the modified code at a source code management system subsequent to the compiling in the first case or in the second case.

18. The non-transitory computer program product of claim 17, wherein the operations further comprise automatically incorporating the committed modified code in a continuous code delivery process.

* * * * *